United States Patent
Anders et al.

(10) Patent No.: US 7,201,964 B2
(45) Date of Patent: Apr. 10, 2007

(54) MOLDED POLYCARBONATE ARTICLES HAVING IMPROVED OPTICAL AND PROCESSING PROPERTIES

(75) Inventors: Siegfried Anders, Köln (DE); Rüdiger Gorny, Moon Township, PA (US); Peter Schwarz, Krefeld (DE); Claus Rüdiger, Krefeld (DE); Jürgen Röhner, Köln (DE)

(73) Assignee: Bayer Materialscience AG, Leverkusen (DE)

( * ) Notice: Subject to any disclaimer, the term of this patent is extended or adjusted under 35 U.S.C. 154(b) by 19 days.

(21) Appl. No.: 10/990,596

(22) Filed: Nov. 17, 2004

(65) Prior Publication Data

US 2005/0158555 A1 Jul. 21, 2005

(30) Foreign Application Priority Data

Nov. 21, 2003 (DE) ................ 103 54 546

(51) Int. Cl.
*B32B 27/36* (2006.01)

(52) U.S. Cl. ................... 428/412; 264/176.1; 264/219; 528/196; 528/198

(58) Field of Classification Search ............. 264/176.1, 264/219; 428/412; 528/196, 198
See application file for complete search history.

(56) References Cited

U.S. PATENT DOCUMENTS

| 4,436,879 | A | 3/1984 | Miller et al. ................. 525/439 |
| 4,661,394 | A | 4/1987 | Curry et al. ................. 428/212 |
| 5,846,659 | A | 12/1998 | Löwer et al. ............... 428/412 |
| 5,856,012 | A | 1/1999 | Kühling et al. ............. 428/412 |
| 6,613,264 | B1 * | 9/2003 | Numrich et al. ............ 264/319 |
| 6,833,193 | B2 | 12/2004 | Anders et al. ............. 428/412 |
| 2003/0064226 | A1 | 4/2003 | Anders et al. ............. 428/412 |

* cited by examiner

*Primary Examiner*—Terressa Boykin
(74) *Attorney, Agent, or Firm*—Joseph C. Gil; Aron Preis

(57) ABSTRACT

A transparent sheet having improved optical properties is disclosed. The sheet that features a deviation angle $\alpha_\epsilon$ (min) according to DIN 52305-A-AS of $\leq 2.0$ and a refracting power $D_\epsilon$ (min) according to DIN 52305-A-AZ of $\leq 0.05$, is prepared by extruding a molding composition comprising linear (co)polycarbonate having weight average molecular weight of 25,000 to 31,000.

10 Claims, No Drawings

MOLDED POLYCARBONATE ARTICLES HAVING IMPROVED OPTICAL AND PROCESSING PROPERTIES

CROSS REFERENCE TO RELATED PATENT APPLICATION

The present patent application claims the right of priority under 35 U.S.C. § 119(a)–(d) of German Patent Application No.103 54 546.8 filed Nov. 21, 2003, which is incorporated herein by reference in its entirety.

FIELD OF THE INVENTION

The invention relates to molded articles and more specifically to extruded articles made of polycarbonate.

SUMMARY OF THE INVENTION

A transparent sheet having improved optical properties is disclosed. The sheet that features a deviation angle $\alpha_\epsilon$ (min) according to DIN 52305-A-AS of $\leq 2.0$ and a refracting power $D_\epsilon$ (min) according to DIN 52305-A-AZ of $\leq 0.05$, is prepared by extruding a molding composition comprising linear (co)polycarbonate having weight average molecular weight of 25,000 to 31,000.

BACKGROUND OF THE INVENTION

Polycarbonate solid shaped articles, in particular polycarbonate solid sheets, are produced by extrusion or injection molding. Relatively large shaped articles, such as large-area motor vehicle glazing or sheets for roofing and other architectural uses, must be produced by extrusion because for technical reasons production by injection molding cannot take place, or at least cannot take place economically.

For extrusion, polycarbonate granules are fed to the extruder and melted in the plasticating system of the extruder. The melt of the plastic is forced through a sheet die and thereby shaped, brought into the desired final shape in the nip of a polishing calender and fixed in shape by reciprocal cooling on polishing stacks and in the ambient air. The polycarbonates of high melt viscosity used for the extrusion are conventionally processed at melt temperatures of 260 to 320° C., and the barrel temperatures of the plasticating barrel and the die temperatures are set accordingly.

Due to the process, the surfaces of the sheet produced are not completely flat but have irregularities. These lead to optical distortions. For various uses, for example glazing of motor vehicles, such optical distortions are undesirable, and for this reason a number of measures for improving the optical properties of extruded polycarbonate shaped articles have already been proposed.

To reduce reflection and optical imperfections of structured, weather-resistant sheets, EP 0 275 252 A proposes a polycarbonate composite sheet, on to the surface of which is applied a protective coating which comprises a methacrylate copolymer.

EP 0 114 290 A describes thermoplastic copolyester-carbonate molding compositions which comprise 1 to 15 wt. % of a branched polycarbonate and 15 to 99 wt. % of a copolyester-carbonate resin. This mixture is said to improve the processing properties and the resistance to hydrolysis as well as the impact strength. It is stated that the optical transparency of the polymer is not substantially impaired by the use of this molding composition.

EP 1 265 943 describes polycarbonate solid shaped articles with improved optical properties which are obtained from a branched polycarbonate of average molecular weight $\overline{M}_w$ 25,000–40,000. No other possibilities for achieving the aim are mentioned.

In the extrusion process already described, volatile constituents volatilize out of the melt of the plastic as soon as the melt emerges from the sheet die. In particular, these are UV absorbers, which in the case of a coextruded sheet are contained in a relatively high concentration in the coextruded thin layers on the sheet surfaces. These volatile constituents partly precipitate on the rolls of the polishing calender and form there a deposit which increases in the course of time and increasingly reduces the surface quality of the sheet produced.

EP 0 649 724 describes a process for the production of multi-layered sheets of plastic from branched polycarbonate having an average molecular weight $\overline{M}_w$ of 27,000–29,500, in which the volatilization of UV absorbers is reduced, so that extrusion can be carried out for a relatively long time without interruption, although the outer layer comprises 1–15 wt. % of a UV absorber. No other possibilities for reducing the volatilization of UV absorbers are mentioned.

The object of the present invention was to provide by extrusion, a transparent polycarbonate solid article, in particular polycarbonate solid sheets, having improved optical properties suitable for use in motor vehicles. The volatilization of volatile constituents should furthermore be reduced and the surface quality of the polycarbonate solid shaped articles therefore improved.

DETAILED DESCRIPTION OF THE INVENTION

Surprisingly, it has been found that this object is achieved by extrusion of polycarbonate molding compositions which comprise linear polycarbonate having a weight average molecular weight ($\overline{M}_w$) of 25,000 to 31,000, preferably 28,000 to 30,000. The hitherto conventional optical distortions of the sheet which are caused by the different forces acting on the surfaces of the extruded sheet are substantially reduced by the practice of the present invention.

The extruded polycarbonate solid sheets according to the invention which are obtainable from the molding composition described above have a deviation angle $\alpha_\epsilon$ (min) determined according to DIN 52305-A-AS of $\leq 2.0$, preferably $\leq 1.7$, and a refracting power $D_\epsilon$ (min) determined according to DIN 52305-A-AZ of $\leq 0.05$, preferably $\leq 0.04$.

It has been found that the deviation angle $\alpha_\epsilon$ may be reduced by more than 30% and the refracting power $D_\epsilon$ by more than 50% compared with sheets obtained in the conventional manner.

Due to these significantly improved optical properties, it is possible to employ the sheets according to the invention as motor vehicle glazing.

The polycarbonate solid sheets according to the invention may further be employed as safety screening, for example on machines and in stadia, as screens in roofs, in noise protection walls and for advertising surfaces. They are suitable in all instances where large-area screens with favorable optical properties are desired.

It has furthermore been found, surprisingly, that in the production, by coextrusion, of a solid sheets protected by a functional layer comprising UV absorbers, the volatilization of the UV absorbers decreases by the use of a linear polycarbonate having weight average molecular weight ($\overline{M}_w$) of up to 31,000, and the deterioration in the quality of the extruded sheet is thus reduced. Where in the processes to date as a rule a deposit on the rolls which cannot be tolerated is formed after an extrusion time of 4 hours, with the practice according to the invention a formation of a deposit was found only on the edges of the rolls after 4 hours.

The invention therefore also provides a process for the production, by coextrusion, of a sheet protected by a functional layer comprising UV absorbers, characterized in that a linear polycarbonate having weight average molecular weight ($\overline{M}_w$) of 25,000 to 31,000 is employed and the coextrusion is operated continuously for at least four hours.

Polycarbonates having too low a molecular weight, e.g. below 25,000, are not suitable for producing sheets because of inferior impact strength.

Linear polycarbonates suitable according to the invention may be prepared by known processes. Suitable processes for the preparation of polycarbonates are, for example, the preparation from bisphenols with phosgene by the phase interface process or from bisphenols with phosgene by the process in a homogeneous phase, the so-called pyridine process, or from bisphenols with carbonic acid esters by the melt transesterification process. The preparation processes are described, for example, in H. Schnell, "Chemistry and Physics of Polycarbonates", Polymer Reviews, volume 9, p. 31–76, Interscience Publishers, New York, London, Sydney, 1964. The preparation processes mentioned are also described in "Polycarbonates" in Encyclopedia of Polymer Science and Engineering, volume 11, second edition, 1988, pages 648 to 718 and in "Polycarbonate" in Becker, Braun, Kunststoff-Handbuch, volume 3/1, Polycarbonate, Polyacetale, Polyester, Celluloseester, Carl Hanser Verlag Munich, Vienna 1992, pages 117 to 299.

The melt transesterification process is described in particular in H. Schnell, "Chemistry and Physics of Polycarbonates", Polymer Reviews, volume 9, p. 44 to 51, Interscience Publishers, New York, Sydney, 1964 and in DE 1 031 512 A, U.S. Pat. No. 3,022,272, U.S. Pat. No. 5,340,905 and U.S. Pat. No. 5,399,659.

The linear polycarbonates employed according to the invention here include homopolycarbonates, copolycarbonates and mixtures thereof. The polycarbonates may be replaced in part or completely by aromatic polyester-carbonates.

Compounds which are preferably employed as starting compounds for the preparation of the linear polycarbonates employed according to the invention are bisphenols of the general formula (I)

HO-Z-OH    (I)

wherein

Z is a divalent organic radical having 6 to 30 carbon atoms, which contains one or more aromatic groups.

Examples of such compounds are bishpenols, which belong to the group of dihydroxydiphenyls, bis(hydroxyphenyl)alkanes, indanebisphenols, bis(hydroxyphenyl) ethers, bis(hydroxyphenyl) sulfones, bis(hydroxyphenyl) ketones and α,α'-bis(hydroxyphenyl)-diisopropylbenzenes.

Particularly preferred bisphenols which belong to the abovementioned groups of compounds are 2,2-bis-(4-hydroxyphenyl)-propane (bisphenol A), tetraalkylbisphenol A, 4,4-(meta-phenylenediisopropyl)diphenol (bisphenol M), 4,4-(para-phenylenediisopropyl)-diphenol, 1,1-bis-(4-hydroxyphenyl)-3,3,5-trimethylcyclohexane (bisphenol TMC) and mixtures thereof.

The weight average molecular weight of the polycarbonates to be used according to the invention may be adjusted, for example, in a known manner by a incorporating a small amount of chain terminators. The chain terminators may be employed individually or as a mixture of various chain terminators.

Suitable chain terminators include monophenols and monocarboxylic acids. Suitable monophenols are e.g. phenol, p-chlorophenol, p-tert-butylphenol, cumylphenol or 2,4,6-tribromophenol, as well as long-chain alkylphenols, such as 4-(1,1,3,3-tetramethylbutyl)-phenol, or monoalkylphenols or dialkylphenols having a total of 8 to 20 C atoms in the alkyl substituents, such as 3,5-di-tert-butylphenol, p-tert-octylphenol, p-dodecylphenol, 2-(3,5-dimethyl-heptyl)-phenol or 4-(3,5-dimethyl-heptyl)-phenol. Suitable monocarboxylic acids are benzoic acid, alkylbenzoic acids and halogenobenzoic acids.

The amount of chain terminator to achieve the desired molecular weight range in the phase interface process is conventionally 2 to 4 mol % of chain terminator, based on the moles of bisphenol.

In the case of preparation by the transesterification process, the amount of chain terminator is selected such that the carbonic acid diester, for example diphenyl carbonate, is employed in excess in relation to the bisphenol, for example 102 to 108 mol of diphenyl carbonate per 100 mol of bisphenol, depending on the distillation columns used.

Polyester-carbonates are preferably obtained by reaction of the bisphenols already mentioned, at least one aromatic dicarboxylic acid and optionally carbonic acid equivalents. Suitable aromatic dicarboxylic acids are, for example, phthalic acid, terephthalic acid, isophthalic acid, 3,3'- or 4,4'-diphenyldicarboxylic acid and benzophenonedicarboxylic acids. A portion, up to 80 mol %, preferably 20 to 50 mol % of the carbonate groups in the polycarbonates can be replaced by aromatic dicarboxylic acid ester groups.

Polycarbonates which are preferred according to the invention are the homopolycarbonate based on bisphenol A, the homopolycarbonate based on 1,1-bis-(4-hydroxyphenyl)-3,3,5-trimethylcyclohexane and the copolycarbonates based on the two monomers bisphenol A and 1,1-bis-(4-hydroxyphenyl)-3,3,5-trimethylcyclohexane and the copolycarbonates based on the two monomers bisphenol A and 4,4'-dihydroxydiphenyl (DOD).

The homopolycarbonate based on bisphenol A is particularly preferred.

The molding composition used according to the invention may comprise, in addition to the linear polycarbonate, additives, such as, for example, UV absorbers and other conventional functional auxiliaries, in particular mold release agents and flow agents, as well as the conventional stabilizers for polycarbonates, in particular heat stabilizers, as well as antistatics, coloring agents, optical brighteners and inorganic pigments.

UV absorbers may be contained in an amount of 0.05 to 15 wt. %, preferably 0.1 to 8 wt. %, based on the weight of the polycarbonate used according to the invention.

Suitable UV absorbers are those compounds which, on the basis of their absorption capacity below 400 nm, are capable of effectively protecting polycarbonate from UV light and have a molecular weight of more than 370, preferably of more than 500.

Suitable UV absorbers are, in particular, the compounds, which are described in WO 99/05205 (=U.S. Pat. No. 6,359,042 incorporated herein by reference), of the formula (II)

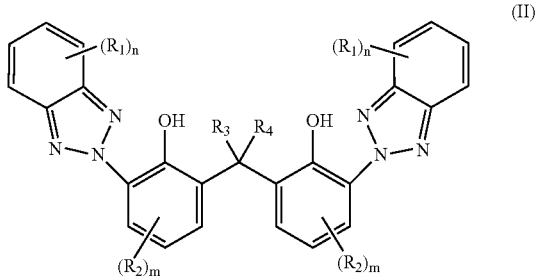

wherein
$R^1$ and $R^2$ are identical or different one from the other and denote H, halogen, $C_1$–$C_{10}$-alkyl, $C_5$–$C_{10}$-cycloalkyl, $C_7$–$C_{13}$-aralkyl, $C_6$–$C_{14}$-aryl, —$OR^5$ or —(CO)—O—$R^5$, where $R^5$H or $C_1$–$C_4$-alkyl,
$R^3$ and $R^4$ are identical or different one from the other and denote H, $C_1$–$C_4$-alkyl, $C_5$–$C_6$-cycloalkyl, benzyl or $C_6$–$C_{14}$-aryl,
m is 1, 2 or 3 and
n is 1, 2, 3 or 4, as well as those of the formula (III)

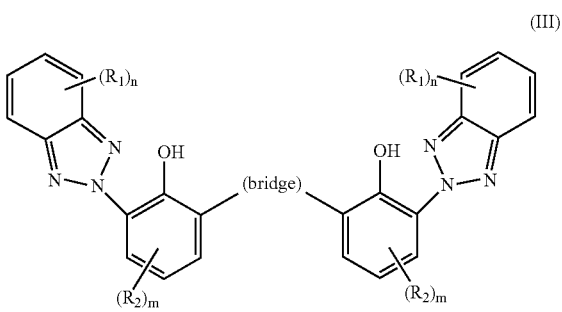

wherein the bridge denotes

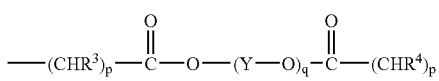

$R^1$, $R^2$, m and n have the meaning given for formula (II), wherein
p is an integer from 0 to 3,
q is an integer from 1 to 10,
Y is —$CH_2$—$CH_2$—, —$(CH_2)_3$—, —$(CH_2)_4$—, —$(CH_2)_5$—, —$(CH_2)_6$— or $CH(CH_3)$—$CH_2$— and
$R^3$ and $R^4$ have the meaning given for formula (II).

Further suitable UV absorbers are those which are substituted triazines, such as 2,4-bis(2,4-dimethylphenyl)-6-(2-hydroxy-4-n-octyloxyphenyl)-1,3,5-triazine (CYASORB® UV-1164) or 2-(4,6-diphenyl-1,3,5-triazin-2-yl)-5(hexyl)oxyphenol (Tinuvin® 1557). 2,2-Methylenebis-(4-(1,1,3,3-tetramethylbutyl)-6-(2H-benzotriazol-2-yl)-phenol), which is marketed commercially under the name Tinuvin® 360 or Adeka Stab® LA 31, is particularly preferred as the UV absorber. The UV absorber Uvinol® 3030 of the general formula (IV)

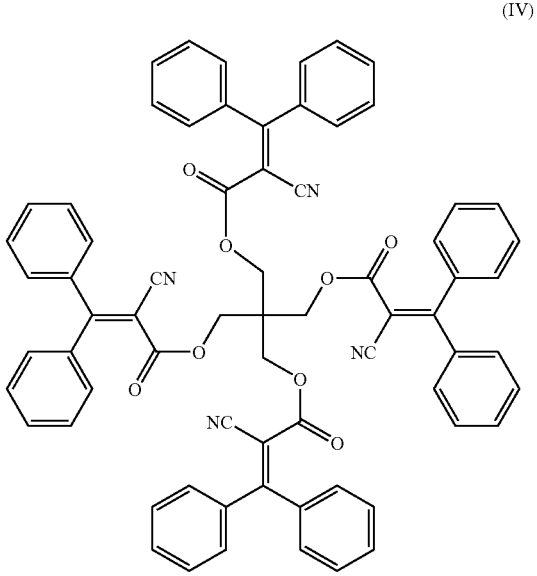

which is obtained in accordance with WO 96/15102 (=U.S. Patent U.S. Pat. No. 5,821,380 incorporated herein by reference) example 1, is furthermore suitable.

The UV absorbers mentioned in EP 0500496 (=U.S. Patent U.S. Pat. No. 5,288,778 incorporated herein by reference) A1 are furthermore suitable.

Suitable stabilizers for the polycarbonate used according to the invention are, for example, phosphines, phosphites or Si-containing stabilizers and further compounds described in EP 0 500 496 A1. Examples which may be mentioned are triphenyl phosphites, diphenyl alkyl phosphites, phenyl dialkyl phosphites, tris-(nonylphenyl) phosphite, tetrakis-(2,4-di-tert-butylphenyl) 4,4'-biphenylene-diphosphonite and triaryl phosphite. Triphenylphosphine and tris-(2,4-di-tert-butylphenyl) phosphite are particularly preferred.

The polycarbonate used according to the invention may furthermore comprise glycerol mono-fatty acid esters. These are preferably employed in amounts of 0.01 to 1 wt. %, particularly preferably 0.02 to 0.3 wt. %, based on the weight of the molding composition. Glycerol mono-fatty acid esters are esters of glycerol with saturated, aliphatic $C_{10}$ to $C_{26}$-monocarboxylic acids, preferably with saturated, aliphatic $C_{14}$ to $C_{22}$-monocarboxylic acids. Glycerol mono-fatty acid esters are to be understood as meaning both those of the primary OH function of glycerol and those of the secondary OH function of glycerol, as well as mixtures of these two isomeric classes of compound. Due to their preparation, the glycerol mono-fatty acid esters may comprise less than 50% of various diesters and triesters of glycerol.

Saturated, aliphatic monocarboxylic acids having 10 to 26 C atoms are, for example, capric acid, lauric acid, myristic acid, palmitic acid, stearic acid, arachic acid, behenic acid, lignoceric acid and cerotic acid. Preferred saturated, aliphatic monocarboxylic acids having 14 to 22 C atoms are, for example, myristic acid, palmitic acid, stearic acid, arachic acid and behenic acid. Particularly preferred saturated, aliphatic monocarboxylic acids are palmitic acid and stearic acid.

The polycarbonate used according to the invention may further comprise 0.01 to 0.5 wt. % of (partial) esters of tetra- to hexahydric alcohols, in particular of pentaerythritol.

Tetrahydric alcohols are, for example, pentaerythritol and mesoerythritol. Pentahydric alcohols are, for example, arabitol, ribitol and xylitol. Hexahydric alcohols are, for example, mannitol, glucitol (sorbitol) and dulcitol.

The esters are the monoesters, diesters, triesters, tetraesters, optionally pentaesters and hexaesters or mixtures thereof, in particular random mixtures, of saturated, aliphatic $C_{10}$ to $C_{26}$-monocarboxylic acids, preferably with saturated, aliphatic $C_{14}$ to $C_{22}$-monocarboxylic acids. Due to their preparation, the commercially obtainable fatty acid esters, in particular of pentaerythritol, may comprise <60% of various partial esters.

Saturated, aliphatic monocarboxylic acids having 10 to 26 C atoms include for example, capric acid, lauric acid, myristic acid, palmitic acid, stearic acid, arachic acid, behenic acid, lignoceric acid and cerotic acid.

Preferred saturated, aliphatic monocarboxylic acids having 14 to 22 C atoms are, for example, myristic acid, palmitic acid, stearic acid, arachic acid and behenic acid.

Saturated, aliphatic monocarboxylic acids, such as palmitic acid and stearic acid, are particularly preferred.

The saturated, aliphatic $C_{10}$ to $C_{26}$-carboxylic acids and the fatty acid esters are either known as such from the literature or may be prepared by processes known from the literature. Examples of pentaerythritol fatty acid esters are those of the particularly preferred abovementioned monocarboxylic acids.

Esters of pentaerythritol with stearic acid and palmitic acid are particularly preferred.

It has furthermore proved to be favorable to add to the polycarbonate used according to the invention compounds of the general formula (V)

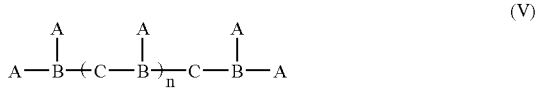
(V)

wherein A denotes a $C_{10}$ to $C_{46}$-fatty acid radical, preferably $C_{22}$ to $C_{34}$-fatty acid radical, B denotes a trihydric alcohol having 3 to 20, preferably 5 to 10 carbon atoms, C denotes a dicarboxylic acid radical having 4 to 40, preferably 5 to 10 carbon atoms and n denotes an integer from 0 to 15. These compounds are commercially obtainable.

They may be processed with the polycarbonate used according to the invention and show no impairments in the shaped articles obtained as the product. The concentration of the compounds conforming to formula (V) in the polycarbonate molding composition is preferably be 0.02 to 1 wt. %, in particular 0.05 to 0.6 wt. %, based on the weight of the molding composition.

For modification of the properties, further conventional functional additives may be admixed with the polycarbonate used according to the invention, and/or applied to the surface of the molded article. Conventional functional additives include for example, fillers, reinforcing substances, stabilizers, such as heat stabilizers and γ-ray stabilizers, antistatics, flow auxiliaries, flameproofing agents, dyestuffs and pigments. The additives mentioned and further additives are described in Gächter, Müller, Kunststoff-Additive, 3rd edition, Hanser-Verlag, Munich, Vienna, 1989.

Examples of antistatics are cationic compounds, for example quaternary ammonium, phosphonium or sulfonium salts, anionic compounds, for example alkyl sulfonates, alkyl sulfates, alkyl phosphates or carboxylates in the form of alkali metal or alkaline earth metal salts, and nonionic compounds, for example polyethylene glycol esters, polyethylene glycol ethers, fatty acid esters or ethoxylated fatty amines. Preferred antistatics are nonionic compounds.

The polycarbonate solid sheets according to the invention may have a thickness of 0.5 mm to 15 mm. They may also be thicker, depending on the field of use. The polycarbonate solid shaped articles may also be composite shaped articles of at least two solid shaped articles, for example sheets, which have been produced by extrusion. In this case the solid polycarbonate solid shaped articles according to the invention are built up from at least two polymer layers.

For production of solid sheets by extrusion, the polycarbonate granules are fed to the hopper of an extruder and pass via this into the plasticating system comprising the screw and barrel.

The material is conveyed and melted in the plasticating system. The melt of the plastic is forced through a sheet die. A filter device, a melt pump, static mixing elements and further components may be arranged between the plasticating system and sheet die. The melt leaving the die passes to a polishing calender. Final shaping takes place in the nip of the polishing calender. Fixing of the shape in the end takes place by cooling, and in particular reciprocally on the polishing stack and in the ambient air. Further devices serve for transportation, application of protective film, cutting to lengths and stacking of the extruded sheets.

In the case of coextrusion, the material to be coextruded (herein coex) is plasticated in the same manner in one or more additional extruders. The coex melt(s) is (are) brought together with the main material in a special coex adapter upstream of the die or in a special coex die. The coex layer may be applied both to one side and to both sides of the base layer. Subsequent working of the sheets may be carried out by thermoforming or hot forming or surface treatments, such as finishing with scratch-resistant coatings, water-spreading layers and other functional layers.

The invention is explained further by the following example.

EXAMPLE 1

For extrusion of polycarbonate solid sheets 6 mm thick and with a width of 600 mm, a linear, high-viscosity polycarbonate, Makrolon® 3103, and a linear polycarbonate of reduced viscosity, Makrolon® 2805, are employed.

The polycarbonates used are both linear. Makrolon 3103 polycarbonate is a homopolymer based on bisphenol A and has a $\overline{M}_w$ of about 32,000 and a melt volume rate (MVR, measured in accordance with ISO 1133) of about 6 cm³/10 min (300° C./1.2 kg). Makrolon 2805 is a similar resin having a $\overline{M}_w$ of about 29,000 and a MVR of 9.5 cm³/10 nm (300° C./1.2 kg).

The production equipment included
    an extruder with a screw of 75 mm diameter (D) and a length of 33×D. The screw has a devolatilization zone;
    a melt pump;
    a cross head;
    a sheet die of 600 mm width;

a triple-roll polishing calender with horizontal roll arrangement, it being possible to swivel the third roll by ±45° with respect to the horizontal;

a roller conveyor;

a device for application of protective film to both sides;

a take-off device;

a length-cutting device (saw);

a stacking table.

From the die the melt passes to the polishing calender, the rolls of which have the temperature stated in table 1. Final shaping and cooling of the material take place on the polishing calender. The sheet is then transported through a take-off device, the protective film is applied on both surfaces, and cutting to lengths by means of a saw and stacking of the sheets then take place.

TABLE 1

| Process parameter | Comparison Makrolon ® 3103 | According to the invention Makrolon ® 2805 |
|---|---|---|
| Temperature extruder Z1 | 300° C. | 270° C. |
| Temperature extruder Z2 | 300° C. | 270° C. |
| Temperature extruder Z3 | 270° C. | 250° C. |
| Temperature extruder Z4 | 260° C. | 240° C. |
| Temperature extruder Z5 | 265° C. | 240° C. |
| Temperature extruder Z6 | 280° C. | 250° C. |
| Temperature cross head | 280° C. | 250° C. |
| Temperature die/side plate | 280° C. | 270° C. |
| Temperature die Z13 | 280° C. | 260° C. |
| Temperature die Z14 | 280° C. | 260° C. |
| Temperature die Z15 | 280° C. | 260° C. |
| Temperature die/side plate | 280° C. | 270° C. |
| Temperature die Z17 | 280° C. | 260° C. |
| Temperature die Z18 | 280° C. | 260° C. |
| Temperature die Z19 | 280° C. | 260° C. |
| Speed extruder | 96 min$^{-1}$ | 90 min$^{-1}$ |
| Speed melt pump | 106 min$^{-1}$ | 106 min$^{-1}$ |
| Temperature roll 1 | 121° C. | 121° C. |
| Temperature roll 2 | 124° C. | 124° C. |
| Temperature roll 3 | 126° C. | 126° C. |
| Calender speed | 0.540 m/min | 0.540 m/min |
| Throughput | 150 kg/h | 150 kg/h |
| Sheet width/thickness | 600 mm/6 mm | 600 mm/6 mm |

The improved optical properties of the solid sheets obtained according to the invention by extrusion are shown in table 2.

TABLE 2

| Sheet of | Deviation angle $\alpha_\epsilon$ (min) DIN 52305-A-AS | Refracting power $D_\epsilon$ (min) DIN 52305-A-AZ |
|---|---|---|
| Makrolon ® 3103 (comparison basis) | 2.14 | 0.0720 |
| Makrolon ® 2805 | 1.69 | 0.0310 |

Lower values for $\alpha_\epsilon$ and $D_\epsilon$ document the reduced optical distortion of the Makrolon ® 2805 sheets obtained according to the invention.

The optical distortion was measured with the aid of a slanting line projection in accordance with DIN 52305 ($\epsilon$=55°).

EXAMPLE 2

For extrusion of polycarbonate solid sheets 2 mm thick and with a width of 320 mm, a linear, high-viscosity linear polycarbonate, Makrolon® 3103, and a linear polycarbonate of reduced viscosity, Makrolon® 2805, are employed.

Both sheets are coextruded on both sides with a UV protection. Layer made of polycarbonate containing about 7 weight percent of a UV absorber.

The equipment used comprises a main extruder with a screw of 60 mm diameter (D) and a length of 33×D. The screw has a devolatilization zone a melt pump upstream of the main extruder a coextruder with a screw of 35 mm diameter (without devolatilization)

a coex adapter a sheet die of 350 mm width;

a triple-roll polishing calender with vertical roll arrangement a roller conveyor;

a take-off device;

a length-cutting device (saw);

a stacking table.

From the die the melt passes to the polishing calender, the rolls of which have the temperature stated in table 3. The melt is introduced between the lower and middle roll. Final shaping and cooling of the material take place on the polishing calender. The sheet is then transported through a take-off device, and cutting to lengths by means of a saw and stacking of the sheets then take place.

TABLE 3

| Process parameter | Comparison Makrolon ® 3103 Extruder Ø 60 mm | According to the invention Makrolon ® 2805 Extruder Ø 60 mm | Coextrusion material for the two experiments Makrolon ® KU1-1241/1 Extruder Ø 35 mm |
|---|---|---|---|
| Temperature extruder Z1 | 300° C. | 270° C. | 250° C. |
| Temperature extruder Z2 | 300° C. | 270° C. | 260° C. |
| Temperature extruder Z3 | 270° C. | 250° C. | 260° C. |
| Temperature extruder Z4 | 260° C. | 240° C. | 260° C. |
| Temperature extruder Z5 | 265° C. | 240° C. | 260° C. |
| Temperature extruder Z6 | 280° C. | 250° C. | |
| Temperature coex adapter | 280° C. | 250° C. | |
| Temperature die Z8 | 280° C. | 260° C. | |
| Temperature die Z9 | 280° C. | 260° C. | |
| Temperature die Z10 | 280° C. | 260° C. | |
| Temperature die Z11 | 280° C. | 260° C. | |
| Temperature die Z12 | 280° C. | 260° C. | |
| Temperature die Z13 | 280° C. | 260° C. | |

TABLE 3-continued

| Process parameter | Comparison Makrolon ® 3103 Extruder Ø 60 mm | According to the invention Makrolon ® 2805 Extruder Ø 60 mm | Coextrusion material for the two experiments Makrolon ® KU1-1241/1 Extruder Ø 35 mm |
|---|---|---|---|
| Speed extruder | 51 min$^{-1}$ | 50 min$^{-1}$ | 12 min$^{-1}$ |
| Temperature upper roll (W3) | 134° C. | 134° C. | |
| Temperature middle roll (W2) | 120° C. | 120° C. | |
| Temperature lower roll (W1) | 110° C. | 110° C. | |
| Calender speed | 1.5 m/min | 1.5 m/min | |
| Throughput | 68 kg/h | 68 kg/h | |
| Sheet width/thickness | 320 mm/2 mm | 320 mm/2 mm | |

The formation of a deposit on the lower polishing stack roll (W1) in the extrusion period of 4 hours was observed and documented.

A clear advantage of the linear Makrolon® 2805 of lower viscosity was observed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A transparent sheet having
    a deviation angle $\alpha_\epsilon$ (min) according to DIN 52305-A-AS of $\leq 2.0$,
    a refracting power $D_\epsilon$ (min) according to DIN 52305-A-AZ of $\leq 0.05$, and a thickness of 0.5 mm to 15 mm, wherein said transparent sheet is prepared by a process comprising,
    (a) extruding a molding composition comprising linear (co)polycarbonate having a weight average molecular weight of 25,000 to 31,000, thereby forming a molten extrudate, and
    (b) passing said molten extrudate through a nip of a polishing calendar.

2. The transparent sheet of claim 1 wherein the deviation angle $\alpha_\epsilon$ is $\leq 1.7$, and the refracting power $D_\epsilon$ is $\leq 0.04$.

3. The transparent sheet of claim 1 wherein said weight average molecular of said linear (co)polycarbonate is from 28,000 to 30,000.

4. The transparent sheet of claim 1 wherein the molding composition comprises polycarbonate.

5. The transparent sheet of claim 1 comprising at least two polymeric layers.

6. The transparent sheet of claim 1 further comprising a functional layer adhesively formed on at least one surface of said transparent sheet.

7. The transparent sheet of claim 6 wherein the functional layer is a scratch-resistant coating.

8. The transparent sheet of claim 6 wherein the functional layer comprises a compound providing protection against UV light and weathering.

9. A motor vehicle glazing comprising the transparent sheet of claim 1.

10. A process for the production of a transparent sheet comprising,
    (a) coextruding a linear (co)polycarbonate having a weight average molecular weight ($\overline{M}_w$) of 25,000 to 31,000, thereby forming a molten extrudate, and
    (b) passing said molten extrudate through a nip of a polishing calendar,
wherein said transparent sheet has a thickness of 0.5 mm to 15 mm.

* * * * *